United States Patent
Sung et al.

(10) Patent No.: US 9,298,171 B2
(45) Date of Patent: Mar. 29, 2016

(54) ROBOT CLEANER AND METHOD FOR CONTROLLING A ROBOT CLEANER

(71) Applicant: LG ELECTRONICS INC., Seoul (KR)

(72) Inventors: Chulmo Sung, Seoul (KR); Hyungsuk Kang, Changwon-si (KR); Inbo Shim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 13/803,761

(22) Filed: Mar. 14, 2013

(65) Prior Publication Data

US 2013/0333153 A1 Dec. 19, 2013

(30) Foreign Application Priority Data

Jun. 13, 2012 (KR) .................. 10-2012-0063011

(51) Int. Cl.
| | |
|---|---|
| *G05B 1/02* | (2006.01) |
| *A47L 9/00* | (2006.01) |
| *A47L 11/40* | (2006.01) |
| *A47L 9/22* | (2006.01) |
| *G05B 13/02* | (2006.01) |

(52) U.S. Cl.
CPC .............. *G05B 13/02* (2013.01); *A47L 9/0072* (2013.01); *A47L 9/22* (2013.01); *A47L 11/4011* (2013.01); *A47L 2201/06* (2013.01); *Y10S 901/01* (2013.01); *Y10S 901/02* (2013.01); *Y10S 901/14* (2013.01); *Y10S 901/46* (2013.01)

(58) Field of Classification Search
CPC ...................... G05B 13/02; G05B 2219/45098; A47L 9/22; A47L 9/0072; A47L 9/2831; A47L 9/2826; A47L 9/2805; A47L 9/28402; A47L 11/4011; A47L 11/00; A47L 2201/06; A47L 2201/00; A47L 2201/04; Y10S 901/01; Y10S 901/20; Y10S 901/46; Y10S 901/14; G05D 2201/0203; G05D 2201/0215
See application file for complete search history.

(56) References Cited

U.S. PATENT DOCUMENTS

| | | | | |
|---|---|---|---|---|
| 5,243,732 A | * | 9/1993 | Koharagi et al. | 15/319 |
| 2004/0200017 A1 | | 10/2004 | Crane et al. | |
| 2009/0049643 A1 | * | 2/2009 | Kim et al. | 15/359 |

FOREIGN PATENT DOCUMENTS

| | | |
|---|---|---|
| EP | 0 320 878 | 6/1989 |
| EP | 0 479 609 | 4/1992 |

OTHER PUBLICATIONS

European Search Report dated Oct. 22, 2013.

* cited by examiner

*Primary Examiner* — Khoi Tran
*Assistant Examiner* — Abby Lin
(74) *Attorney, Agent, or Firm* — Ked & Associates, LLP (57) ABSTRACT

A robot cleaner and a method for controlling a robot cleaner are provided. The method may include sensing a stored value of a pulse width modulation (PWM) duty ratio based on a voltage of a battery; comparing a measured value of the PWM duty ratio with the stored value to calculate a difference between the measured value and the stored value; upon determining that the difference between the measured value and the stored value is equal to or greater than a first set value, calculating a distributed value of acceleration on a substantially vertically extending axis of the robot cleaner; and, upon determining that the distributed value of acceleration deviates from a range of a second set values, increasing a force to suction foreign matter.

19 Claims, 7 Drawing Sheets

ROBOT CLEANER AND METHOD FOR CONTROLLING A ROBOT CLEANER

CROSS-REFERENCE TO RELATED APPLICATION(S)

This application claims priority to Korean Patent Application No. 10-2012-0063011, filed in Korea on Jun. 13, 2012, which is hereby incorporated by reference as if fully set forth herein.

BACKGROUND

1. Field

A robot cleaner and a method for controlling a robot cleaner are disclosed herein.

2. Background

Robot cleaners are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to embodiments, examples of which are illustrated in the accompanying drawings. Wherever possible, like reference numerals have been used throughout the drawings to refer to the same or like parts.

In the drawings, sizes and shapes of elements may be exaggerated for convenience and clarity of description. Also, terms specially defined in consideration of the construction and operation of embodiments may vary depending upon intentions of users or operators or usual practices. The definition of such terms may be made based on this disclosure.

Generally, a vacuum cleaner is a device that suctions air containing foreign matter from outside using an air suction device provided in a cleaner body of the vacuum cleaner to generate air suction force and separate the foreign matter from the air to collect dust. The vacuum cleaner performing the above functions may be classified, for example, as a manual vacuum cleaner that is directly manipulated by a user or a robot cleaner that performs automatic cleaning without user manipulation.

The robot cleaner is a device that travels within a region to be cleaned to suction foreign matter, such as dust, from a floor. In other words, the robot cleaner automatically performs cleaning within a predetermined region.

The robot cleaner may include a distance sensor to sense a distance from the robot cleaner to obstacles, such as furniture, office supplies, and walls, located within a region to be cleaned, and left and right wheels to move the robot cleaner. The left and right wheels may be configured to be rotated by a left wheel motor and a right wheel motor, respectively. As the left wheel motor and the right wheel motor are rotated, the robot cleaner may perform indoor cleaning while changing travel directions.

Also, a suction nozzle to suction foreign matter from a floor may be provided at a lower part of the robot cleaner. The suction nozzle may include a nozzle case unmovably fixed to a cleaner body of the robot cleaner, a suction port formed at a bottom of the nozzle case to suction foreign matter, and an agitator rotatably provided in the suction port to sweep the foreign matter on a floor into the suction port.

Conventional robot cleaners perform cleaning using uniform suction force regardless of a material of a floor on which cleaning is performed, resulting in a reduced cleaning performance on carpet, from which it is difficult to suction foreign matter.

Figure 1:
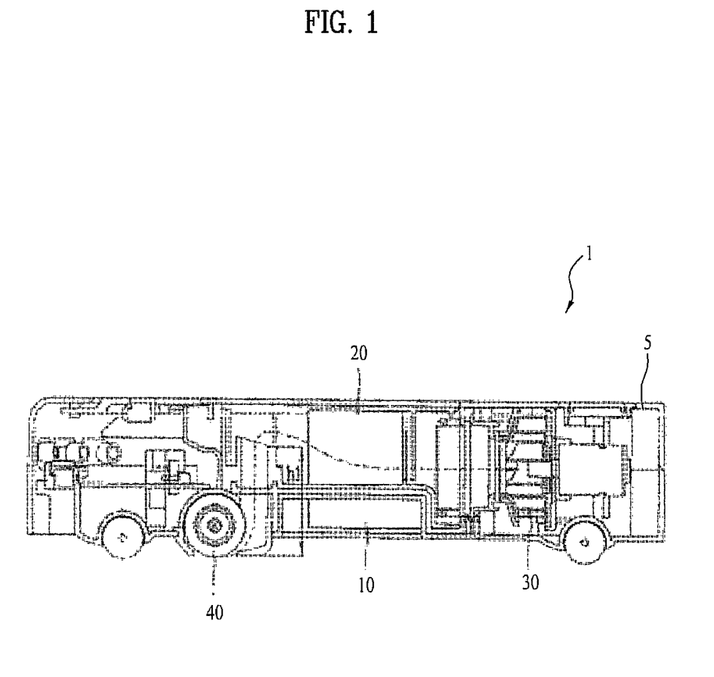
FIG. 1 is a side sectional view schematically showing a robot cleaner according to an embodiment.

FIG. 1 is a side sectional view schematically showing a robot cleaner according to an embodiment. Principal components of the robot cleaner will be described herein in brief. A battery 10, which may be formed in the shape of a rectangular parallelepiped and supply power necessary to operate the robot cleaner 1, may be provided in the robot cleaner 1, such that the battery 10 may be charged. As the battery 10 may be heavy, the battery 10 may be located at a middle portion of a lower part of the robot cleaner, such that the robot cleaner may perform a cleaning operation while smoothly moving in a balanced state.

A dust box 20 to store collected dust may be located above the battery 10. Also, a suction fan 30 to suction dust from a floor may be provided. The suction fan 30 may suction dirt or dust separated from the floor by rotation of an agitator 40 mounted at a lower part of a cleaner body 5 of the robot cleaner 1. Both the suction fan 30 and the agitator 40 may be driven by power supplied from the battery 10.

Figure 2:
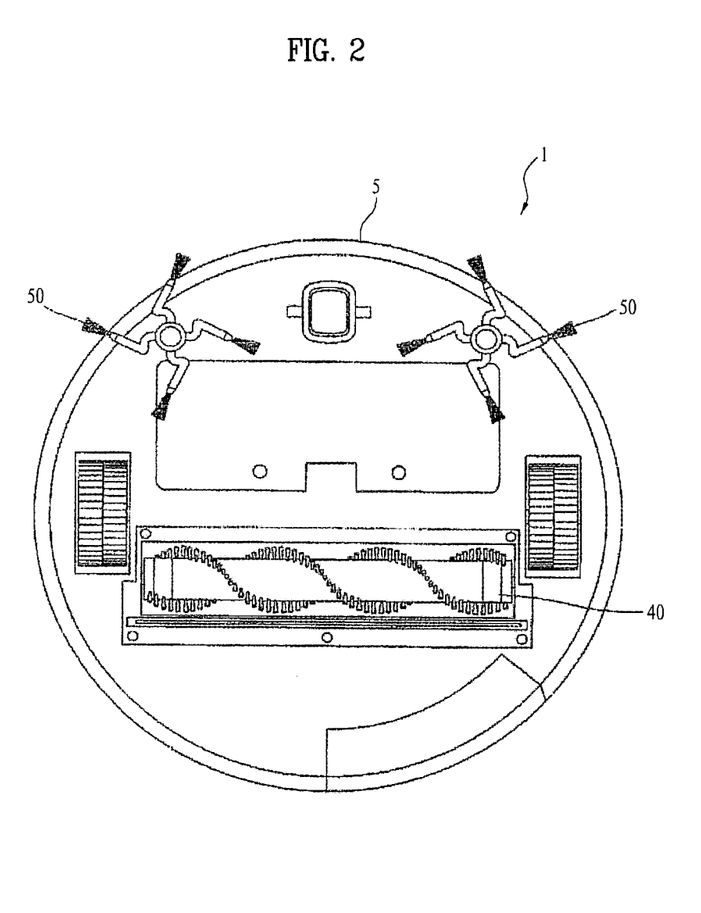
FIG. 2 is a bottom view of the robot cleaner of FIG. 1.

FIG. 2 is a bottom view of the robot cleaner of FIG. 1. Side brushes 50 may be provided at a lower part of the cleaner body 5 of the robot cleaner 1 to improve cleaning efficiency, in addition to the agitator 40. The side brushes 50 may be mounted at opposite sides of the lower part of the cleaner body 5 of the robot cleaner 1, such that the side brushes 50 rotate about substantially vertically extending rotary shafts to sweep dust on the floor into the cleaner body 5 of the robot cleaner 1. Foreign matter, such as dust, separated from a floor or wall by the side brushes 50 may be suctioned into the cleaner body 5 by the suction fan 30.

Figure 3:
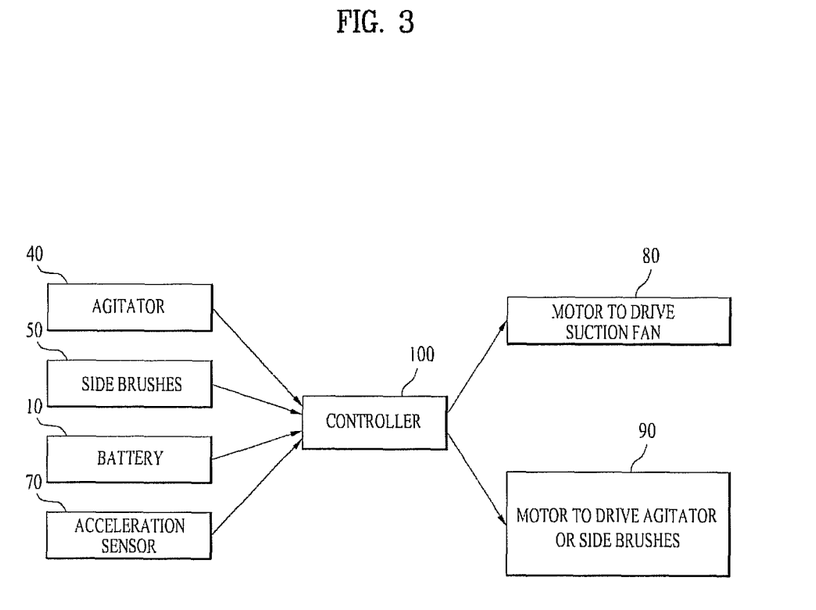
FIG. 3 is a block diagram of the robot cleaner of FIG. 1.

FIG. 3 is a block diagram of the robot cleaner of FIG. 1. Hereinafter, the robot cleaner according to embodiments will be described with reference to FIG. 3.

The agitator 40 and the side brushes 50 may be rotated to separate foreign matter from a floor or wall. A pulse width modulation (PWM) duty ratio of the agitator 40 and/or the side brushes 50 may be transmitted to a controller 100. As the agitator 40 and the side brushes 50 contact the floor or wall, frictional force between the agitator 40 and the side brushes 50 and the floor or wall may change as a floor material or a wall material changes with the result that the PWM duty ratio of the agitator 40 or the side brushes 50 may also change.

Also, a voltage of the battery 10 may be transmitted to the controller 100 during cleaning. As cleaning is performed, the voltage of the battery 10 may gradually be reduced.

An acceleration sensor 70 may be mounted at or on the cleaner body 5 of the robot cleaner 1 to sense acceleration of the robot cleaner 1 with respect to a z axis, that is, a vertical or substantially vertically extending axis. A signal regarding the change in acceleration sensed by the acceleration sensor 70 may be transmitted to the controller 100. When the robot cleaner 1 passes over an uneven surface in the floor, the robot cleaner 1 may move upward and downward. The acceleration sensor 70 may sense the change in acceleration of the robot cleaner 1 with respect to the z axis.

The controller 100 may change a rotational speed of a motor 80 to drive the suction fan 30 based on signals transmitted from the above-discussed components. As the rotational speed of the motor 80 is increased, a force to suction foreign matter may be increased, and therefore, it is possible to more effectively suction the foreign matter.

Also, the controller 100 may change a rotational speed of a motor 90 to drive the agitator 40 and the side brushes 50 based on signals transmitted from the above-discussed components. As the rotational speed of the motor 90 is increased, foreign matter may be more easily separated from the floor or wall.

Figure 4:
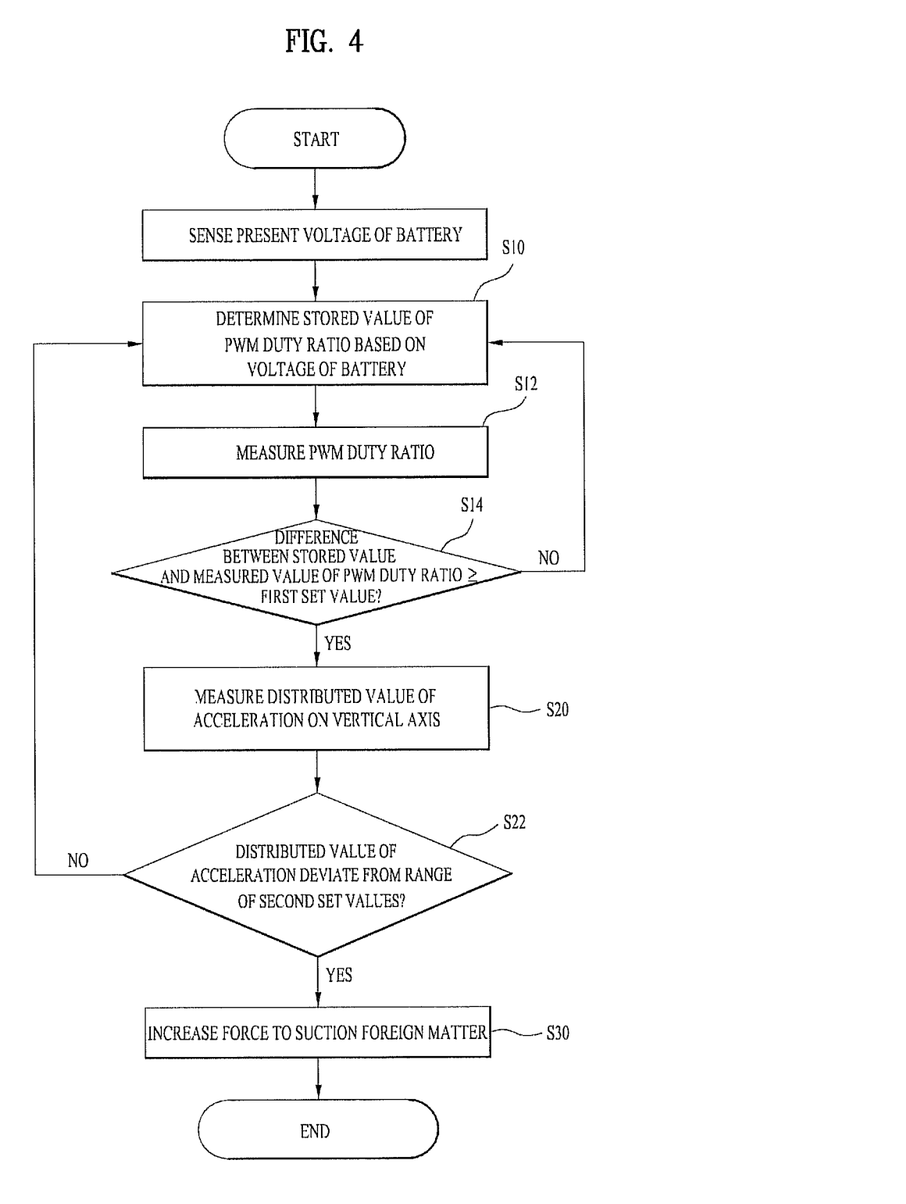
FIG. 4 is a flowchart of a method for controlling a robot cleaner according to an embodiment.
Figure 5:
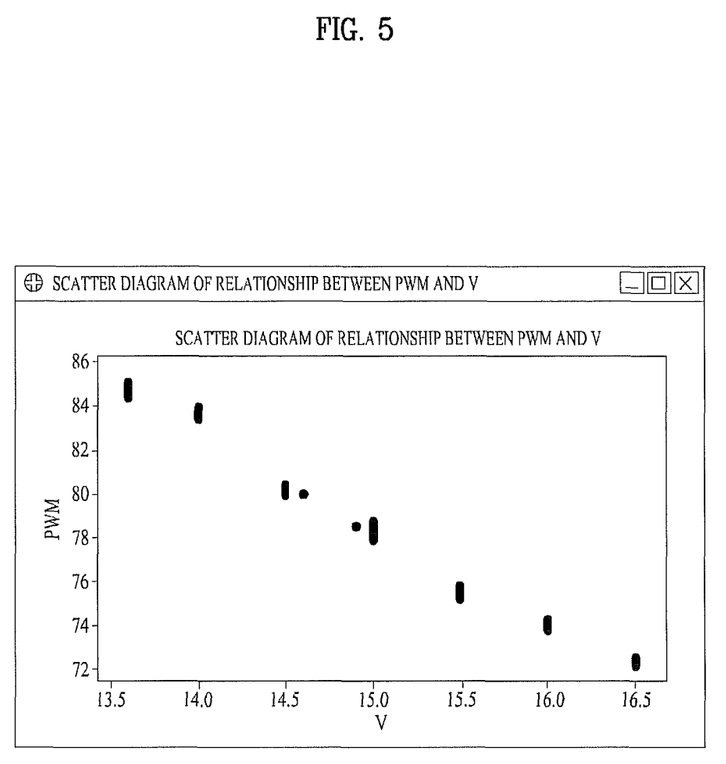
FIG. 5 is a graph showing a relationship between pulse width modulation (PWM) duty ratio and battery voltage according to an embodiment.
Figure 6:
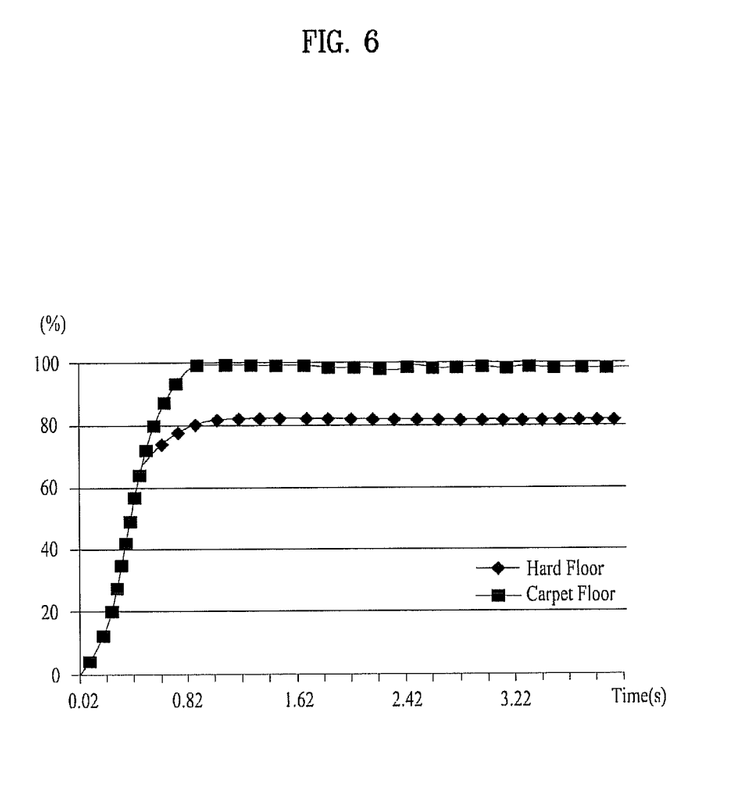
FIG. 6 is a graph showing a difference in PWM duty ratios in a case in which the battery has a voltage of approximately 14.5 V.
Figure 7:
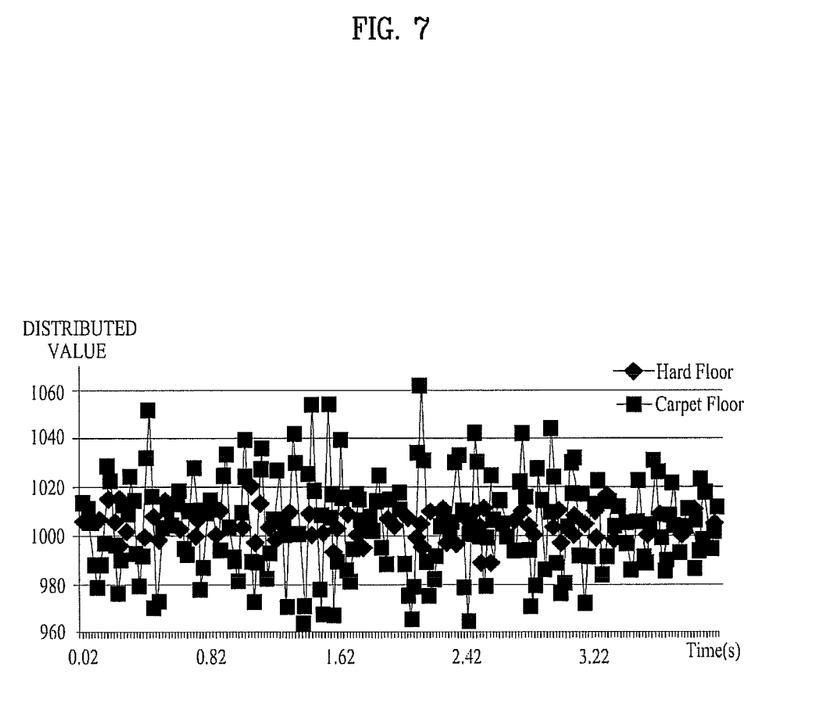
FIG. 7 is a graph showing distributed data measured by an acceleration sensor.

FIG. 4 is a flowchart of a method for controlling a robot cleaner, such as robot cleaner 1 of FIGS. 1-3, according to an embodiment. FIG. 5 is a graph showing a relationship between pulse width modulation (PWM) duty ratio and battery voltage according to embodiments. FIG. 6 is a graph showing a difference between PWM duty ratios in a case in which the battery has a voltage of approximately 14.5 V. FIG. 7 is a graph showing distributed data measured by an acceleration sensor. Hereinafter, operation of a robot cleaner will be described with reference to FIGS. 4 to 7.

First, a present voltage of a battery, such as battery 10 of FIGS. 1-3, may be sensed, in step S5. As cleaning is performed, the voltage of the battery may be reduced. For this reason, it is necessary to continuously sense voltage of the battery during cleaning.

A predetermined PWM duty ratio may be determined based on the sensed voltage of the battery, in step S10. The predetermined PWM duty ratio may be set and stored by an operator during manufacture of the robot cleaner. For example, the PWM duty ratio may be a PWM duty ratio of an agitator, such as agitator 40 of FIGS. 1-3, or side brushes, such as side brushes 50 of FIGS. 1-3.

As shown in FIG. 5, the PWM duty ratio may change based on a voltage value V of the battery. The PWM duty ratio may be approximated by a linear equation. For example, the stored value of the PWM duty ratio may be calculated by an equation of Y (PWM)=B*(A*X (Battery Voltage)), where A and B indicate tuned constant values. The values A and B may be set by an operator. Using the measured present voltage value of the battery, therefore, it is possible to calculate a PWM duty ratio of a specific floor material.

The stored value of the PWM duty ratio may be a basic value based on a floor material that enables the robot cleaner to suction foreign matter from the floor without difficulty at a normal rotational speed of a suction fan, a normal rotational speed of the agitator, and a normal rotational speed of the side brushes.

It can be seen from FIG. 5 that the PWM duty ratio is about 72% when the voltage of the battery is about 16.5 V, and the PWM duty ratio is about 80% when the voltage of the battery is about 14.5 V. Subsequently, a controller, such as controller 100 of FIGS. 1-3, may measure a present value of the PWM duty ratio, in step S12. For example, the PWM duty ratio may be a PWM duty ratio of the agitator or the side brushes. As the floor material changes, the PWM duty ratio of the agitator or the side brushes rotated in contact with a floor or wall may also change.

The difference between the measured value of the PWM duty ratio and the stored value of the PWM duty ratio may be calculated, and it may be determined whether the calculated difference between the measured value of the PWM duty ratio and the stored value of the PWM duty ratio is equal to or greater than a first set value, in step S14.

FIG. 6 is a graph showing a difference in PWM duty ratios in a case in which the battery has a voltage of approximately 14.5 V. On a hard floor, that is, a floor on which cleaning is effectively performed using a normal cleaning force, it is possible to smoothly perform cleaning even in a case in which the PWM duty ratio is approximately 80%. On the other hand, on a carpeted floor, that is, a floor from which it is difficult for the robot cleaner to remove foreign matter, the PWM duty ratio of the agitator or the side brushes may be increased to about 100%. As a result, a difference between the measured value of the PWM duty ratio and the stored value of the PWM duty ratio may be generated.

A first set value may be a value to determine the difference between the measured value of the PWM duty ratio and the stored value of the PWM duty ratio. The first set value may be set to a minimum of approximately 15%. When the battery is fully charged to a voltage of approximately 16.5 V, as shown in FIG. 5, the predetermined PWM duty ratio with respect to the hard floor may be decreased to approximately 72%. When the voltage of the battery is reduced to approximately 13.5 V, however, the predetermined PWM duty ratio with respect to the hard floor may be increased to approximately 85%. In a case in which the stored value of the PWM duty ratio is approximately 85%, the difference between the measured value of the PWM duty ratio and the stored value of the PWM duty ratio may be approximately 15% when the measured PWM duty ratio is approximately 100%. For this reason, the above first set value may be a minimum value to distinguish between the hard floor and the carpeted floor based on the difference between the measured value of the PWM duty ratio and the stored value of the PWM duty ratio.

If the first set value is increased, it may be possible to more accurately determine a floor material corresponding to the carpeted floor. Therefore, the first set value may be approximately 15% or more.

If the difference between the measured value of the PWM duty ratio and the stored value of the PWM duty ratio is equal to or greater than the first set value, a distributed value of acceleration on a vertical or substantially vertically extending axis may be calculated using an acceleration sensor, such as acceleration sensor 70 of FIGS. 1-3, in step S20.

With embodiments disclosed herein, the change in floor material may be sensed using the distributed value of acceleration, as well as the PWM duty ratio, and therefore, it is possible to more reliably determine the change in floor material. The distributed value of acceleration means statistical data on changed values of acceleration measured a large number of times.

Subsequently, it may be determined whether the distributed value of acceleration calculated as described above deviates from a range of second set values, in step S22. The distributed value of acceleration may include a plurality of values measured at predetermined time intervals.

It is also possible to determine whether a greater part, that is, a majority or more or ⅔ or more, of the measured values deviates from the range of second set values. A percentage of the numbers of the distributed value of acceleration measured as described above deviating from the second set value may be variously changed by an operator. This is because the distributed value of acceleration is a value changed based on time, and the distributed value of acceleration may be instantaneously increased or decreased by an obstacle, such as a threshold, even though the floor material does not change.

As shown in FIG. 7, in the case of a hard floor, on which cleaning is performed using a normal cleaning force without increasing the cleaning force, the distributed value of acceleration does not deviate from a range of approximately 980 to 1020. On the other hand, it can be seen that the distributed value of acceleration decreases to approximately 980 or less or increases to approximately 1020 or more in the case of a carpeted floor, on which it is necessary to perform cleaning using an increased cleaning force. In this case, the range of second set values may be set to a range between approximately 980 and 1020. Of course, it is also possible to set the range of second set values to have a range wider than the range between approximately 980 and 1020 for more strict determination regarding the carpeted floor.

Upon determining that the distributed value of acceleration deviates from the range of second set values, a force to suction foreign matter may be increased, in step S30. That is, the change in floor material may be sensed using the change in the PWM duty ratio and the change in the distributed value of acceleration, and upon determining that the floor material has changed, cleaning may be performed using a cleaning force higher than a normal cleaning force.

At this time, the controller may control a rotational speed of a motor, such as motor 80 of FIGS. 1-3, to drive a suction fan, such as suction fan 30 of FIGS. 1-3, to be increased such that foreign matter is suctioned using a higher suction force. Foreign matter, which may not be suctioned using a normal suction force of the suction fan, may be suctioned using the increased suction force of the suction fan. This is because a contact force between foreign matter and the floor surface of the hard floor is low, whereas a contact force between foreign matter and the floor surface of the carpeted floor is high. For this reason, the higher suction force is necessary to separate the foreign matter from the floor surface of the carpeted floor.

Also, the controller may control both the rotational speed of the agitator and the rotational speed of the side brushes to be increased. To this end, it may be possible to increase the rotational speed of a motor 90, such as motor 90 of FIGS. 1-3, to drive the agitator 40 or the side brushes 50. As the rotational speed of the agitator and the rotational speed of the side brushes are increased, foreign matter may be more easily separated from the floor surface, thereby improving cleaning performance.

Foreign matter may be easily separated from a hard floor, whereas foreign matter may not be easily separated from a carpeted floor, which has greater frictional force with respect to the foreign matter. For this reason, it is not possible to achieve a desired cleaning performance using a normal cleaning force. With embodiments disclosed herein, the agitator or the side brushes may be rotated using a higher force on the carpeted floor, such that foreign matter may be easily separated from the floor surface of the carpeted floor.

In the same manner, the controller may control the motor to drive the suction fan to be increased, such that foreign matter may be suctioned using a higher suction force. Consequently, it is possible to more easily suction foreign matter from the floor surface.

As is apparent from the above description, embodiments disclosed herein may have the following advantages. It is possible to sense a change in floor material based on a load applied to side brushes and an agitator and to change cleaning performance based on the changed floor material. It is also possible to sense the floor material irrespective of remaining battery power.

Embodiments disclosed herein provide a robot cleaner capable of increasing a suction force when a floor material is changed, for example, when it is difficult to suction foreign matter, thereby improving cleaning performance, and a control method thereof. Embodiments disclosed herein further provide a robot cleaner capable of sensing a floor material irrespective of a remaining power of a battery, and a control method thereof.

Embodiments disclosed herein provide a control method of a robot cleaner that may include sensing a stored value of a pulse width modulation (PWM) duty ratio based on a voltage of a battery mounted in the robot cleaner; comparing a measured value of the PWM duty ratio with the stored value of PWM duty ratio to calculate a difference between the measured value of PWM duty ratio and the stored value of PWM duty ratio; upon determining that the difference between the measured value of PWM duty ratio and the stored value of PWM duty ratio is equal to or greater than a first set value, calculating a distributed value of acceleration on a vertical axis of the robot cleaner; and upon determining that the distributed value of acceleration deviates from a range of a second set value, increasing force to suction foreign matter. The change of a floor material based on load applied to side brushes and an agitator may be sensed to change a cleaning performance based on the changed floor material.

The sensing and comparing may include sensing a PWM duty ratio of an agitator or side brushes. The increasing may include increasing a rotational speed of a motor to drive a suction fan upon determining that that the distributed value of acceleration deviates from the range of the second set value. Also, the increasing may include increasing a rotational speed of the agitator and a rotational speed of the side brushes upon determining that that the distributed value of acceleration deviates from the range of the second set value.

The first set value may be approximately 15% or more. The distributed value of acceleration may include a plurality of values measured at predetermined time intervals. The second set value may have a range of 980 to 1020. The distributed value of acceleration may be measured by an acceleration sensor.

Embodiments disclosed herein provide a robot cleaner that may include a battery to supply power, an agitator and side brushes rotatably mounted in a lower part of a cleaner body, a motor to drive the agitator and the side brushes, a motor to provide a rotational force to a suction fan to suction foreign matter, and an acceleration sensor to measure acceleration of the cleaner body in a vertical axis direction, and a controller to calculate a difference between a stored value of a PWM duty ratio based on a voltage of the battery and a measured value of the PWM duty ratio, to calculate a distributed value of acceleration on a vertical axis of the robot cleaner upon determining that the difference between the stored value of the PWM duty ratio and the measured value of the PWM duty ratio is equal to or greater than a first set value, and to control a force to suction foreign matter to be increased upon determining that the distributed value of acceleration deviates from a range of a second set value.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot cleaner, comprising:
   determining a stored value of a pulse width modulation (PWM) duty ratio based on a voltage of a battery of the robot cleaner;
   comparing a measured value of a PWM duty ratio with the stored value of the PWM duty ratio to calculate a difference between the measured value of the PWM duty ratio and the stored value of the PWM duty ratio;
   upon determining that the difference between the measured value of the PWM duty ratio and the stored value of the PWM duty ratio is equal to or greater than a first set value, calculating a distributed value of acceleration on a vertical axis of the robot cleaner; and
   upon determining that the distributed value of acceleration deviates from a range of second set values, increasing a force to suction foreign matter.

2. The method according to claim 1, wherein the comparing includes sensing a PWM duty ratio of an agitator or side brushes.

3. The method according to claim 2, wherein the increasing includes increasing a rotational speed of a motor to drive a suction fan upon determining that the distributed value of acceleration deviates from the range of the second set values.

4. The method according to claim 2, wherein the increasing includes increasing a rotational speed of the agitator and a rotational speed of the side brushes upon determining that the distributed value of acceleration deviates from the range of the second set values.

5. The method according to claim 1, wherein the first set value is approximately 15% or more.

6. The method according to claim 5, wherein the range of the second set values is approximately 980 to 1020.

7. The method according to claim 1, wherein the distributed value of acceleration includes a plurality of values measured at predetermined time intervals.

8. The method according to claim 1, wherein the distributed value of acceleration is measured by an acceleration sensor.

9. A robot cleaner, comprising:
   a battery to supply power;
   an agitator and side brushes rotatably mounted in a cleaner body;
   a motor to drive the agitator and the side brushes;
   a motor to provide rotational force to a suction fan to suction foreign matter; and
   an acceleration sensor to measure acceleration of the cleaner body in a substantially vertically extending axis direction; and
   a controller to calculate a difference between a stored value of a pulse width modulation (PWM) duty ratio based on a voltage of the battery and a measured value of the PWM duty ratio, to calculate a distributed value of acceleration on the vertically extending axis of the robot cleaner upon determining that the difference between the stored value of the PWM duty ratio and the measured value of the PWM duty ratio is equal to or greater than a first set value, and to control a force to suction foreign matter to be increased upon determining that the distributed value of acceleration deviates from a range of second set values.

10. The robot cleaner according to claim 9, wherein the controller controls a rotational speed of the motor to drive the suction fan to be increased upon determining that the distributed value of acceleration deviates from the range of the second set values.

11. The robot cleaner according to claim 9, wherein the controller controls a rotational speed of the agitator or the side brushes to be increased upon determining that that the distributed value of acceleration deviates from the range of the second set values.

12. The robot cleaner according to claim 9, wherein the controller controls a PWM duty ratio of the agitator or the side brushes to be sensed.

13. The robot cleaner according to claim 9, wherein the distributed value of acceleration includes a plurality of values measured at predetermined time intervals.

14. The robot cleaner according to claim 9, wherein the first set value is approximately 15% or more.

15. The robot cleaner according to claim 9, wherein the range of the second set values is approximately 980 to 1020.

16. A method for controlling a robot cleaner, comprising:
   determining a change in floor material; and
   increasing or decreasing a force to suction foreign material, based on the change in floor material, wherein the determining a change in floor material includes determining a change in floor material based on a voltage of a battery of the robot cleaner, a pulse width modulation ratio, and a distributed value of acceleration with respect to a vertically extending axis direction.

17. The method according to claim 16, wherein the determining a change in floor material further includes:
   measuring a current voltage of the battery;
   determining a stored pulse width modulation (PWM) duty ratio corresponding to the current voltage of the battery;
   measuring a current PMW duty ratio;
   comparing the measured PWM duty ratio with the stored PWM duty ratio to calculate a difference between the measured PWM duty ratio and the stored PWM duty ratio; and
   upon determining that the difference between the measured PWM duty ratio and the stored PWM duty ratio is equal to or greater than a first set value, calculating a distributed value of acceleration with respect to the substantially vertically extending axis of the robot cleaner.

18. The method according to claim 17, wherein the increasing or decreasing a force to suction foreign material, based on the change in floor material, includes:
   upon determining that the distributed value of acceleration deviates from a range of second set values, increasing a force to suction foreign matter.

19. The method according to claim 16, wherein increasing or decreasing a force to suction foreign material, based on the change in floor material, includes:
   increasing a force to suction foreign material, based on the change in floor material, when a floor surface changes ino a carpeted floor surface.

* * * * *